US00RE47746E

(19) United States
(12) Reissued Patent
Seymour et al.

(10) Patent Number: US RE47,746 E
(45) Date of Reissued Patent: Dec. 3, 2019

(54) RELOAD KIT FOR FIRE EXTINGUISHER

(71) Applicant: Rusoh, Inc., Eau Claire, WI (US)

(72) Inventors: Justun Seymour, Eau Claire, WI (US); Ryan Barrows, Eau Claire, WI (US); Seth Rooney, Chippewa Falls, WI (US); Randy Frank Rousseau, Riverside, CA (US)

(73) Assignee: Rusoh, Inc., Eau Claire, WI (US)

(21) Appl. No.: 29/651,249

(22) Filed: Jan. 23, 2018

Related U.S. Patent Documents

Reissue of:
(64) Patent No.: Des. 797,999
Issued: Sep. 19, 2017
Appl. No.: 29/566,668
Filed: Jun. 1, 2016

(51) LOC (12) Cl. ..... 29-02
(52) U.S. Cl.
USPC ..... D29/126
(58) Field of Classification Search
USPC ..... D23/213, 214, 215, 223, 224, 225, 231; D7/591; D28/5, 6
CPC .. A62C 2/00; A62C 8/00; A62C 13/76; A62C 13/64; A62C 13/70; A62C 13/66
See application file for complete search history.

(56) References Cited

U.S. PATENT DOCUMENTS

D171,066 S * 12/1953 Sciver ..... D29/126
3,650,329 A * 3/1972 Sachs ..... A62C 13/003 169/85
3,858,659 A * 1/1975 Fukushima ..... A62C 13/70 169/77
7,318,484 B2 * 1/2008 Rousseau ..... A62C 13/003 169/77
7,650,948 B2 * 1/2010 Rousseau ..... A62C 13/70 169/23
D682,034 S * 5/2013 El-Saden ..... D7/510
D693,170 S * 11/2013 Rosbach ..... D7/392.1
8,757,582 B2 * 6/2014 Robinson ..... F16K 31/1221 251/25
8,820,423 B2 * 9/2014 Rousseau ..... A62C 13/66 169/71
D732,647 S * 6/2015 McPhilliamy et al. ..... D23/355
D738,741 S * 9/2015 Shafer ..... D9/690
9,144,699 B1 9/2015 Wang
D751,670 S * 3/2016 Loiti Urquia ..... D23/225
D777,991 S 1/2017 Rousseau et al.
D797,999 S 9/2017 Seymour et al.
(Continued)

OTHER PUBLICATIONS

"U.S. Appl. No. 29/615,505, Notice of Allowance dated Nov. 13, 2018", 5 pgs.

(Continued)

*Primary Examiner* — Philip S Hyder
(74) *Attorney, Agent, or Firm* — Schwegman Lundberg & Woessner, P.A.

(57) CLAIM

The ornamental design for a reload kit for fire extinguisher, as shown and described.

DESCRIPTION

FIG. 1 is a top perspective view.
FIG. 2 is a side plan view; and,
FIG. 3 is a front plan view.
Broken lines in the drawings are included for the purpose of illustrating an environment and form no part of the claimed design. The claimed invention can be used in other environments.

1 Claim, 3 Drawing Sheets

Figure 1:
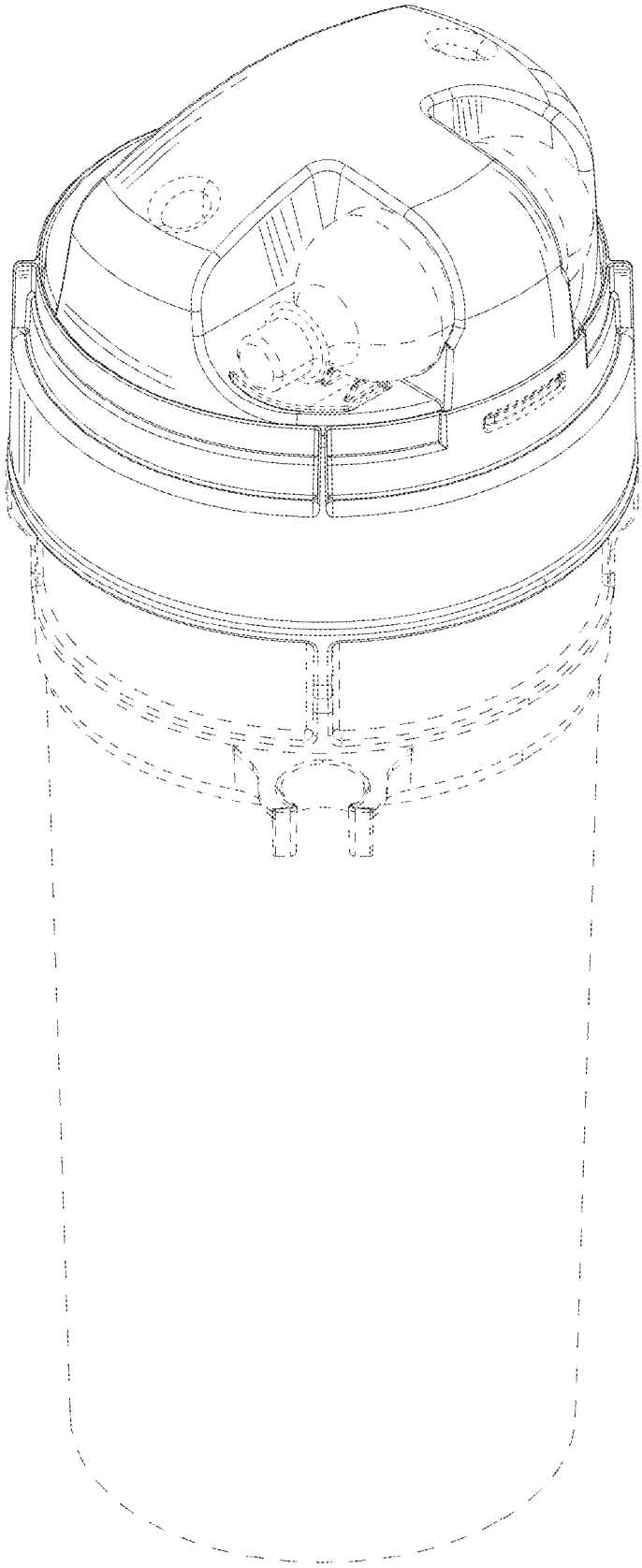
Figure 2:
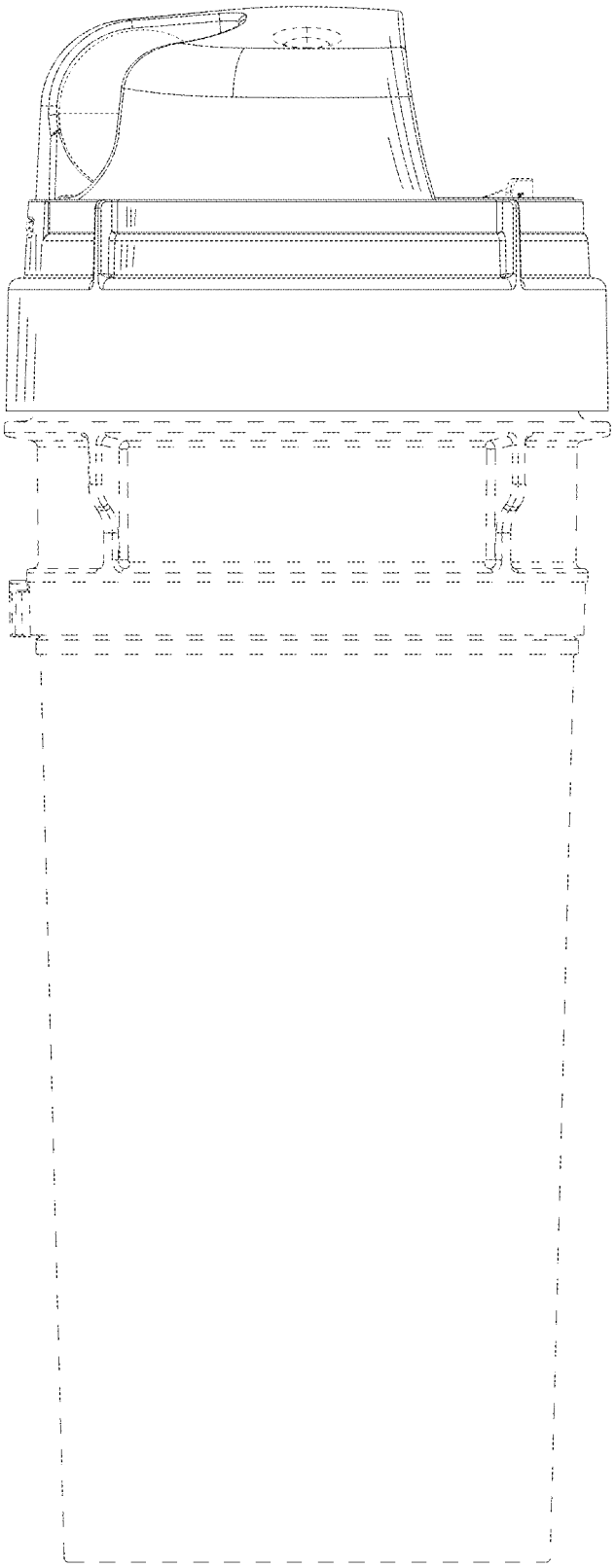
Figure 3:
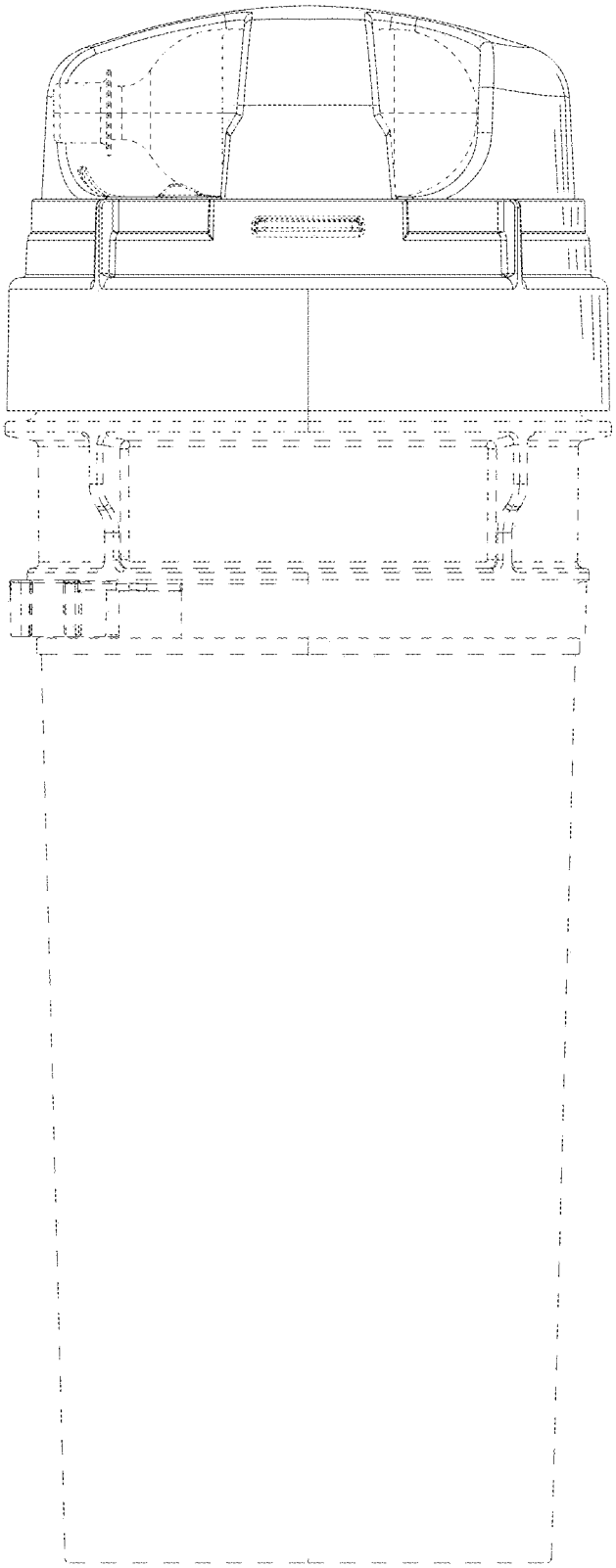

Matter enclosed in heavy brackets [ ] appears in the original patent but forms no part of this reissue; matter printed in italics indicates the additions made by reissue.

(56) References Cited

U.S. PATENT DOCUMENTS 9,914,001 B1 * 3/2018 Wang ..... A62C 13/70

OTHER PUBLICATIONS

"U.S. Appl. No. 29/566,668, Notice of Allowance dated May 23, 2017", 8 pgs.
"U.S. Appl. No. 29/566,668, Preliminary Amendment dated Jul. 13, 2016", 4 pgs.
"U.S. Appl. No. 29/566,668, Response dated Apr. 21, 2017 to Restriction Requirement dated Feb. 21, 2017", 4 pgs.
"U.S. Appl. No. 29/566,668, Restriction Requirement dated Feb. 21, 2017", 5 pgs.
"U.S. Appl. No. 29/615,505, Preliminary Amendment dated Aug. 29, 2017", 7 pgs.

* cited by examiner